May 15, 1951 — J. E. SHAFER — 2,553,337
BEARING ASSEMBLY
Filed Sept. 21, 1948
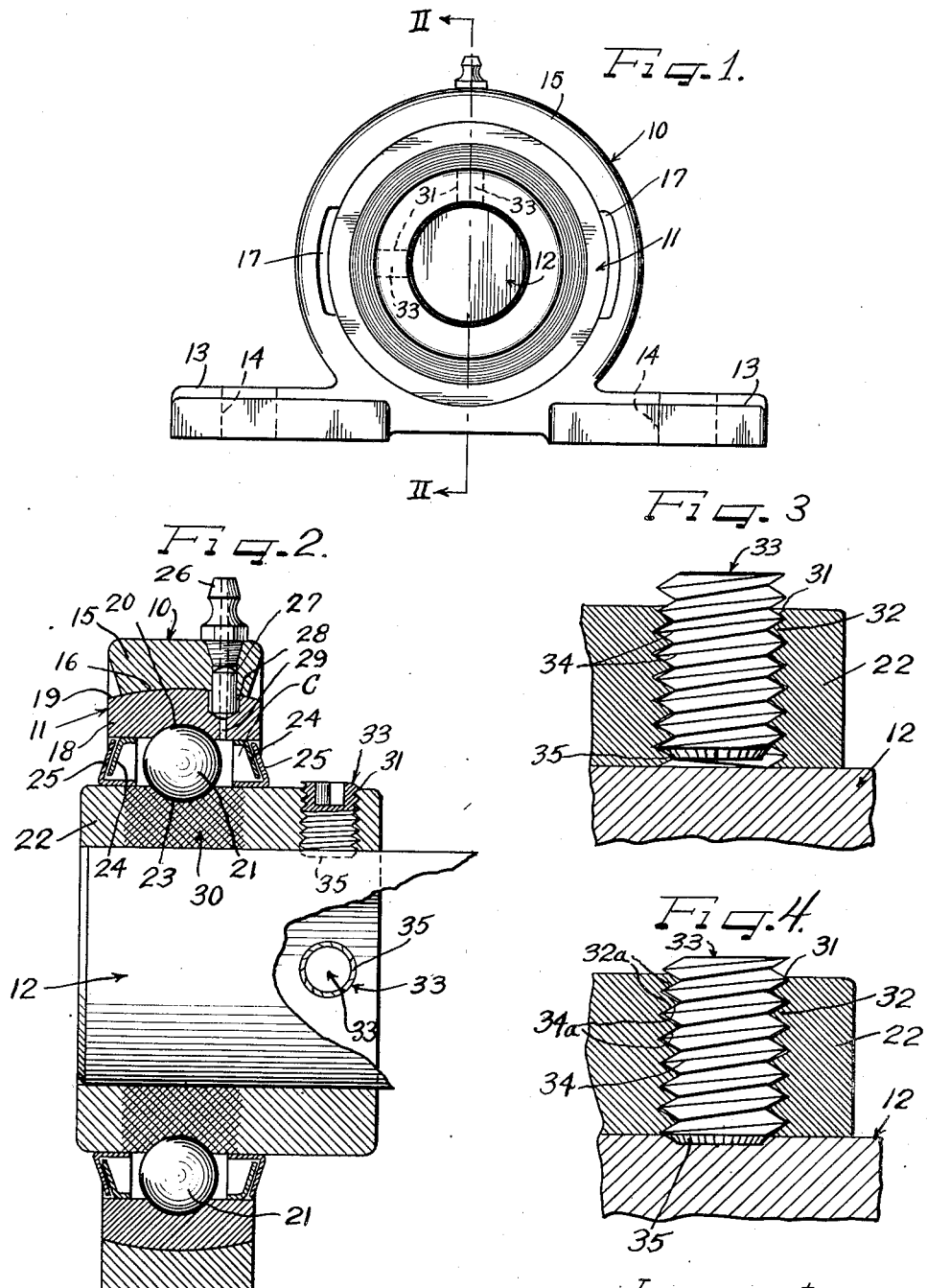
Inventor
JULIUS E. SHAFER
by The Firm of Charles W. Hills Attys.

Patented May 15, 1951

2,553,337

UNITED STATES PATENT OFFICE 2,553,337

BEARING ASSEMBLY

Julius E. Shafer, Chicago, Ill.

Application September 21, 1948, Serial No. 50,278

1 Claim. (Cl. 308—236)

This invention relates to bearing assemblies adapted to be fixedly locked on shafts or the like by means of set screws threaded through a bearing race ring.

Specifically, the invention relates to the provision of an inner race ring for a shaft and ball bearing assembly which has a hard metal ball race and an integral extended soft metal sleeve portion containing threaded holes receiving hard set screws which will deform the threads into wedged engagement with the screws when they are tightened against the shaft.

This application is a continuation in part of my copending application entitled: "Bearing Assembly," Serial No. 636,151, filed December 20, 1945, and now Patent No. 2,501,100, issued March 21, 1950.

According to the present invention, the inner race ring of a sealed ball bearing unit is extended, at least on one side thereof, beyond the outer race ring. This inner race ring is composed of a steel adapted to be locally hardened in the ball race region thereof but the extended portion of the ring is quite soft. The extended portion is provided with one or more threaded radial holes containing relatively coarse threads which, due to the soft nature of the steel and high speed commercial threading technique, will be somewhat irregular. Hard metal set screws are threaded through these holes to engage a shaft or other member inserted through the race ring. When these hard set screws are tightened against the shaft or other inserted member, their threads will deform the threads in the soft race ring portion into tight wedging engagement therewith. This wedged engagement prevents loosening of the set screws even when the bearing assembly is subjected to extreme loads and vibrations. Since the main body of the inner bearing ring is soft it will adapt itself to any irregularities which prevent full mating relationship between the ring and the inserted shaft. At the same time the locally hardened portion of the race ring will effectively resist wear of the antifriction or ball elements.

This invention therefore not only eliminates heretofore necessary separate shaft adaptors, lock collars, or the like devices for attaching a bearing to a shaft, but also insures maintenance of locked shaft and bearing relationship without sacrificing wear resistance of the bearing unit. The use of a relatively soft inner race ring in the bearing unit makes possible the heavy stressing of this ring to hold the locked relationship without cracking the ring while the local hardened portion of the ring resists wear to the same extent as completely hardened race rings. The locally hardened portion preferably extends completely through the race ring at the ball groove area thereof so that a locally hardened inner surface is obtained in addition to the locally hardened ball groove. This hardened inner surface will effectively resist any wear tending to enlarge the bore of the race ring. Thus the shaft, while being locked to a soft portion of the race ring, is also seated in a hard portion of the race ring.

It is, then, an object of this invention to provide a bearing unit with an extended inner race ring in which the extended portion is relatively soft and carries hard set screws which, when tightened against a shaft or other member inserted in the race ring, will deform the race ring into wedged engagement therewith.

A still further object of this invention is to provide an efficient set screw lock for industrial bearing units by providing an integral soft extended portion on the inner race ring of the unit with threaded set screw-receiving holes which are deformed into wedged engagement when set screws therein are tightened against an inserted shaft or the like in the race ring.

A still further object of this invention is to provide an industrial bearing unit with a soft inner race ring that is locally hardened through the raceway area thereof to effectively resist wear on the inner and outer surfaces of the ring, but which contains a main body portion that is dead soft and adapted to be deformed without cracking the ring.

Another object of this invention is to provide an inner race ring for a bearing unit with a main body that is composed of soft steel and having a locally hardened race portion in spaced relation from internally threaded radial holes containing relatively coarse deformable screw threads adapted to be deformed into wedging engagement with an inserted screw.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view of a bearing assembly according to this invention, including a sealed bearing unit mounted in a pillow block mounting.

Figure 2 is an enlarged vertical cross-sectional view, with parts in side elevation, taken along the line II—II of Figure 1.

Figure 3 is an enlarged fragmentary cross-sectional view, with a part in elevation, illustrating the relationship of the locking screw and bearing race ring before the screw is tightened against a shaft in the race ring.

Figure 4 is a view similar to Figure 3 but showing the relationship of the parts after the set screw has been tightened against the shaft.

As shown on the drawings:

The one-piece pillow block 10 of Figure 1, tiltably mounts a sealed bearing unit 11, which unit, in turn, rotatably mounts a shaft 12. The pillow block 10 has feet 13—13 with bolt holes 14—14 therethrough for receiving bolts (not shown) which fixedly mount the pillow block in position. An annular strap portion 15 is provided between the feet 13—13 and, as shown in Figure 2, this strap portion 15 has a concave segmental spherical inner face or bearing wall 16. Slots 17—17 are provided on diametrically opposite sides of the strap portion 15 to extend through the inner bearing wall thereof for receiving the sealed bearing unit 11 when this bearing unit is in horizontal position. The unit, when inserted through the slots 17—17, can then be tilted 90° into vertical position to be seated on and tiltably retained by the concave bearing wall 16 of the strap 15.

As best shown in Figure 2, the sealed bearing unit 11 includes an outer race ring 18 with a convex segmental spherical outer bearing wall 19 tiltably seated on the concave inner bearing wall 16 of the strap portion 15. This ring 18 has a ball groove or raceway 20 formed around its inner periphery intermediate the sides of the ring to receive a row of ball bearings 21.

An inner race ring 22 extends through the outer race ring 18 in radially spaced relationship therewith and has an external ball groove or raceway 23 therearound to receive the row of ball bearings 21. The ball bearings 21 and the raceways 20 and 23 cooperate to hold the rings 18 and 22 against relative axial movement but in radial spaced apart relationship. The rings rotate freely relative to each other on the row of ball bearings 21. The outer ring 18 can tilt in the strap 15 of the pillow block to accommodate for misalignment between the pillow block and the shaft 12.

Seals are provided on opposite sides of the row of ball bearings 21 to form a sealed ball chamber C. These seals include retainers 24 pressed into the outer ring 18 and flingers 25 pressed onto the inner ring. The flingers and retainers cooperate through overlapping sloping flanged portions to protect the chamber C against ingress of dirt or loss of lubricant. This chamber C is conveniently supplied with lubricant through a fitting 26 threaded into the strap portion 15 of the pillow block 10. A locking pin 27 extends from the bore in the strap portion beneath the fitting 26 into a dimple 28 in the outer race ring 18. A small bore 29 connects the bottom of the dimple with the chamber C. The locking pin 27 will permit tilting movement of the bearing unit 11 relative to the pillow block 10, but will hold the outer race ring 18 of this unit against rotation in the pillow block strap.

In accordance with this invention, the inner race ring 22 is composed of soft steel of a type that is adapted to be locally hardened through the ball groove or raceway region 23 without hardening the main body of the ring. A suitable steel is SAE–52100, of the following analysis:

.95 to 1.1% carbon;
.2 to .5% manganese;
.03% phosphorus;
.035% sulphur;
1.2 to 1.5% chromium;
Balance iron.

The main body of the ring 22 is dead soft and has a Brinell hardness of only around 200. This ring is locally heated, either by high frequency induction, or by local impingement of flames, at the area surrounding the raceway 23 thereof to raise the temperature of the steel within its critical range without raising the main body of the ring to the critical range of the steel. The heated area is then quenched to form a hardened zone 30 extending completely through the ring as best shown in Figure 2. This zone 30 will preferably have a Rockwell C hardness of 64 or 65 while, as explained above, the remainder of the ring will be dead soft, having a Brinell hardness of only around 200.

The ring 22 has at least one portion thereof extending appreciably beyond the side face of the ring 18. This extended portion is provided with one or more radial holes 31. These holes are arranged either 90° or 120° apart, a 90° arrangement being shown on the drawings. Each hole 31 has a relatively coarse screw thread 32 therethrough. A U. S. No. 5 thread is satisfactory. Since such a thread is formed through a dead soft portion of the ring under rapid commercial threading conditions, the individual threads will be somewhat rough and out of perfect alignment. This normal thread condition of roughness and misalignment is utilized to good advantage in the present invention.

Each hole 31 receives a socket head set screw 33 which is case-hardened or otherwise hardened so that the threaded portion thereof has a Rockwell C hardness of around 56. The threads on the socket head set screw, as illustrated in Figure 3 of the drawings, will not have full mating engagement with the threads 32. Thus, as shown in Figure 3, the set screw threads 34 are spaced from some portions of the threads 32 and are in threaded engagement with other portions. An off-center relationship is provided.

The inner end of each set screw 33 is provided with a toothed rim 35 for biting into the shaft 12 when the set screw is tightened against the shaft.

As shown in Figure 4, the tightened set screw 33 has the rim end 35 thereof forced into the shaft 12 thereby loading the set screw in the hole 31 and causing the threads 34 of the set screw to deform the inner thread walls 32a of the threads 32 into full engagement with the outer thread walls 34a of the set screw to insure full wedged contact between these thread faces, thus locking the set screw in the hole 31. The soft screw threads 32 are thereby deformed by the hard set screw threads 34 into full seating engagement with the loaded surfaces 34a of the threads 34 to lock the set screw 33 against rotation in the hole 31. This deformation of the soft screw threads 32 and the resultant loading of the ring 22 will not stress the hardened portion 30 of the ring, because the dead soft main body of the ring can be deformed to accommodate any irregularities such as might exist between the interior of the ring and the shaft. At the same time, the hardened portion 30 extends into contact with the shaft to resist wearing action on the inside of the ring as well as to resist wear in the ball raceway 23. Because the inner race ring can be deformed into full conformity with an irregular shaft, and because the locking screws can deform the threads of this inner race ring to maintain the screws in locked engagement in the ring, and because the ring still contains a hardened portion at the points of wear, the bearing unit of this invention will withstand as much strain and wear as a unit containing a completely hardened inner race ring. In addition, the bearing unit of this invention will remain locked on a shaft under vibration loads which quickly loosen other types of locks. It has been found that if hardened set screws are threaded into hardened portions of inner race rings of bearing units, the same will become loosened within a few hours under heavy vibrating conditions, while, under the same vibrating conditions, the set screw and soft bearing ring arrangement of this invention will show no loosening and no wear after 500 hours' continuous operation.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A bearing assembly for mounting a shaft or the like which comprises an outer race ring, an inner race ring projecting through the outer race ring and extending axially beyond at least one side of the outer race ring, said race rings having opposed raceways, anti-friction rolling elements between said rings riding on said raceways and rotatably mounting the inner race ring in the outer race ring, a shaft extending through said inner race ring, said inner race ring being composed of a relatively soft metal and having a local hardened zone defining the raceway thereof but terminating short of the axially extending soft portion thereof, said soft extended portion of the inner race ring having a threaded hole therethrough, a hard metal screw threaded into said hole against the shaft inserted in said inner race ring, and said hard screw having hard threads deforming the threads in the hole when the screw is tightened against the inserted shaft whereby the screw is locked in the hole to secure the inserted shaft against relative movement in the inner race ring.

JULIUS E. SHAFER.

REFERENCES CITED

The following references are of record in the file of this patent:

UNITED STATES PATENTS

| Number | Name | Date |
|---|---|---|
| 1,973,994 | Peterson | Sept. 18, 1934 |
| 2,145,864 | Denneem et al. | Feb. 7, 1939 |
| 2,259,325 | Robinson | Oct. 14, 1941 |
| 2,419,691 | Shafer | Apr. 29, 1947 |
| 2,437,305 | Nickle | Mar. 9, 1948 |